United States Patent

Bier

[11] Patent Number: 4,517,469
[45] Date of Patent: May 14, 1985

[54] CIRCUIT FOR A CURRENT CONSUMING DEVICE IN A MOTOR VEHICLE

[75] Inventor: Axel Bier, Bad Rappenau, Fed. Rep. of Germany

[73] Assignee: Audi NSU Auto Union Aktiengesellschaft, Fed. Rep. of Germany

[21] Appl. No.: 493,207

[22] Filed: May 10, 1983

[30] Foreign Application Priority Data

May 15, 1982 [DE] Fed. Rep. of Germany ....... 3218479

[51] Int. Cl.$^3$ .............................................. B60Q 3/02
[52] U.S. Cl. ................................ 307/10 LS; 307/140; 315/84
[58] Field of Search .................. 307/10 LS, 115, 140, 307/141, 10 R; 315/77, 84; 180/316; 340/52 R, 54

[56] References Cited

U.S. PATENT DOCUMENTS 4,324,986 4/1982 Hara et al. ...................... 307/10 LS
4,385,258 5/1983 Voll ............................. 307/10 LS X

FOREIGN PATENT DOCUMENTS 2659658 7/1978 Fed. Rep. of Germany .

Primary Examiner—A. D. Pellinen
Assistant Examiner—Derek S. Dennings
Attorney, Agent, or Firm—Kane, Dalsimer, Kane, Sullivan and Kurucz

[57] ABSTRACT

This invention pertains to a circuit for controlling an electric device in a motor vehicle such as a light. The circuit has a control switch, a door switch and a semiconductor switch. The control switch activates the device either directly, or through the door and semiconductor switches. The control switch also has a neutral position in which the device is deactivated and the semiconductor switch is off reducing the current drain of the device on the motor vehicle battery.

3 Claims, 2 Drawing Figures

CIRCUIT FOR A CURRENT CONSUMING DEVICE IN A MOTOR VEHICLE

BACKGROUND OF THE INVENTION

The invention relates to a circuit for a current consuming device in a motor vehicle such as an interior space light, and the like. Such a circuit for an interior space light is known from the German Patent DE-OS No. 30 06 932. In this device, the first switch is the conventional manually actuated switch and the second switch is the door contact switch which is closed when the vehicle door is opened. The first switch can assume three positions, namely a first closed position wherein the light is burning when the second switch is closed, that is, when the door is open, a second closed position wherein the light is always burning even if the second switch is open and a third open position in which the light does not burn even if the second switch is closed. Now, it can happen that the first switch is in its open third position and the second switch is closed because a door may not have been closed or not closed completely. In this case the light does not burn, however a base current still flows through a transistor so that the battery is discharged if the vehicle remains in this condition for a longer period of time, in particular in the case where the transistor must have a low forward bias voltage and therefore cannot be a Darlington transistor with a high current amplification.

OBJECTIVE AND SUMMARY OF THE INVENTION

It is therefore an object of the invention to provide a circuit of the aforementioned type which as a very low current drain when the circuit utilization device is switched off.

To solve this object of the invention a comparator is provided whose output is connected, by means of a diode to the base of a second transistor which is inserted in the circuit for controlling or feeding the base current to the first transistor, whose inverted input is connectd to a reference voltage source and whose noninverted input is connected to the line between the first switch and the first transistor.

When the first switch, that is the manually actuated switch for interior space lighting is in its open position the voltage on the noninverting input of the comparator is 0 volts, so that consequently the output voltage of the comparator is also 0 volts, and the semiconductor switch formed with the second transistor is closed. When the second switch is closed while the first switch is in the open position, the current which otherwise flows to the base of the first transistor is blocked by the open semiconductor switch. Only a low quiescent current in the order of the 1 mA flows therethrough which is caused by the low power drain of the comparator and the resistive losses of the voltage dividers. This leakage current can be further reduced by one to two orders of magnitude by using a CMOS-type comparator. When the first switch is closed, the voltage on the noninverting input of the comparator is higher than the reference voltage. Accordingly, the output voltage of the comparator is equal to the battery voltage which turns the transistor on. After the second transistor is closed, a base current can flow through the conductive collector-emitter path of the second transistor, thereby switching the first transistor on and the current utilization device, that is, the interior space light, is now also turned on. If the current utilization device should be still on or be connectd to the supply voltage after the opening of the second switch for a time period $\Delta T$ (for example, during the night when interior space light is desired after the closing of the door) and when the second switch is connected to ground, advantageously a comparator (operational amplifier) may be used for controlling the base current, so as to reduce the contact stress on the second switch and to minimize the size of the condenser whose capacitance is directly proportional to the time duration $\Delta T$. Thereby, the noninverted input of the second comparator is connected, by means of a high resistance dropping resistor, with a second reference voltage source and simultaneously through a diode with the output of the first comparator and its inverted input, by means of a resistor, to the supply voltage and in addition is connected to the second switch by means of two diodes which are switched in series, while its output is connected with the base of the frist transistor. The condenser, which together with the resistor of the inverted input determine the time duration $\Delta T$, is therefore disposed parallel to the second switch. When the first switch is opened, the value of the output voltage of the first comparator is 0-volt and the voltage applied to the noninverted input of the second comparator is equal to a diode threshold voltage, so that no base current is flowing to the first transistor regardless of whether the second switch is opened or closed, because even with a closed switch a higher voltage value is applied on the inverted input which is higher by one diode threshold voltage than on the noninverted input of the second comparator because of the two diodes in series. When the second switch is closed while the first one is open only a low quiescent current flows through the circuit which is caused by the low power drain of the integrated semiconductor switch formed by the two comparators and the resistive losses of the associated voltage dividers. Therefore, the second switch is only loaded by the extremely low control current which flows through the high resistance dropping resistor on the inverted input of the comparator, whereby the short-duration discharge current impulse of the condenser prevents an oxidation of the switch contacts during each closing operation.

BRIEF DESCRIPTION OF THE DRAWINGS

The invention will be explained in the following in conjunction with two exemplified embodiments illustrated in the drawings.

DESCRIPTION OF THE PREFERRED EMBODIMENT

Figure 1:
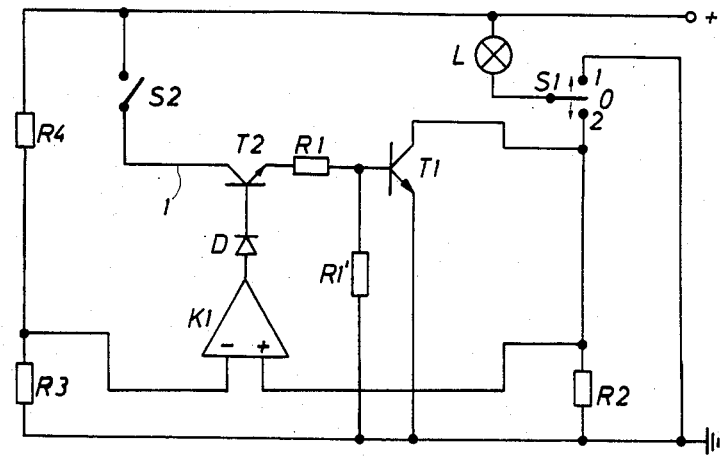
FIG. 1 illustrates a first circuit wherein the base current of the first transistor is switched directly by the second switch.

At first, I would like to discuss FIG. 1 which illustrates a circuit for an interior space light L of a motor vehicle. The light L is connected, on the one hand, to the positive pole of the vehicle battery, and, on the other hand, can be connected to the negative pole, i.e., to ground by means of a switch S1 either directly (position 1) or through a transistor T1 (position 2). Switch S1 also has an open position 0. A second switch S2 is disposed in the base current circuit 1 of the transistor T1 which is closed for an open vehicle door and which is open for a closed vehicle door. A comparator K1 with it associated output is connected to the base of the transistor T2 which is disposed in circuit 1, by means of a diode D. Its inverted input is connected to a reference voltage source which preferably comprises a voltage divider with two resistors R3 and R4. The noninverted input of the comparator K1 is connected to the collector of transistor T1 and in addition to ground by means of an input leakage resistance R2. A resistor R1 in the base circuit 1 limits the base current through switch S2 and therefore also the current which flows through a semiconductor comprising a second transistor T2, the diode D and the comparator K1, when the same is switched on. A resistor R1' between the base of the transistor T1 and ground takes care that the transistor T1 is not switched on when the semiconductor switch is closed but switch 2 is open whereby a small offset current flows from the comparator through T2, R1 and R1' to ground.

When the switch S1 is in the position 1, light L is always burning. When the switch S1 is in the position 2, the light only burns when switch S2 is closed. The battery voltage essentially is applied to the noninverted input of the comparator K1 in the position 2 of switch 1 when switch S2 is in its open position because the resistance of R2 is much greater than the resistance of light L. This voltage is higher than the reference voltage applied on the inverted input of the comparator K1, the output voltage of the comparator K1 becomes equal to the battery voltage. This output does not affect transistor T1 because the base current which flows through the base emitter path of the transistor T2 is too low and is drained off by the leakage resistor R1'. When switch S2 is closed, a base current flows through the conductive collector emitter path of the transistor T2, the transistor T1 switches on and the light L burns. The voltage on the non-inverted input of the comparator K1 drops to the collector-to-emitter voltage of transistor T1, but is still higher than the reference voltage on the inverted input, so that the previously defined semiconductor switch remains on.

When the switch S1 is in the position zero, voltage is applied on the noninverted input of the comparator K1. Since this voltage is lower than the reference voltage on the inverted input of the comparator K1, the output voltage is 0-volt and thereby the collector emitter path of transistor T2 is closed. Even if switch S2 is closed due to an accidental open vehicle door, no current can flow through the closed semiconductor switch to the bases of transistor T1. The quiescent current through the circuit in this situation which is caused by the low power drain of comparator K1 and the resistive loss of divider R3, R4, is an order of magnitude below 1 mA and does not result in a discharge of the vehicle battery even if the vehicle door would be accidentally left open for days. Without the inventive circuit at least the current drain, i.e. the base current of transistor T1 of about 30 mA would flow when switch S2 is closed and switch S1 is open.

Figure 2:
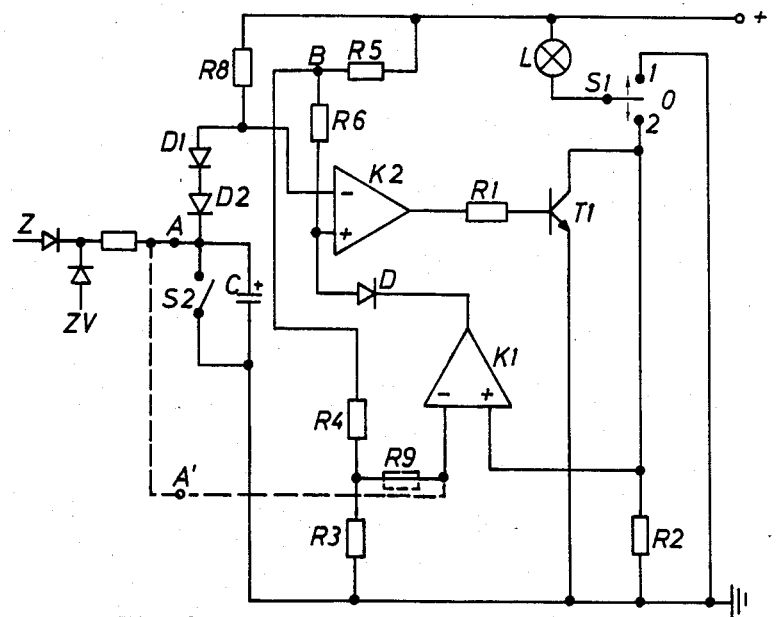
FIG. 2 illustrates a circuit wherein the base current of the transistor is switched through an operational amplifier.

The circuit in accordance with FIG. 2 differs from the one illustrated in FIG. 1 substantially in that a second comparator K2 (an operational amplifier) is disposed between the switch S2 and the base circuit 1, so as to switch transistor T1, whereby the current to be switched by switch S2 is kept low, so that light L can stay on for a period $\Delta T$ after switch S2 is opened and switch S1 is in position 2. The inputs of the first comparator K1 are switched in the same manner as in FIG. 1. The output of the first comparator K1 is connected to the noninverted input of the second comparator K2 by means of diode D. The non-inverting input to the second comparator, is also connected to a second reference voltage source by means of dropping resistor R6. Preferably the second voltage reference source also consists of a resistive voltage divider having resistors R3, R4 and R5. The inverted input of the comparator K2 is connected through a high resistance resistor R8 to the positive supply voltage and simultaneously through a series of two switching diodes D1 and D2 and switch S2, to ground. A condenser C is connected in parallel to switch S2. The switch S2 and thereby the condenser C is also connected to terminal A on which a voltage is applied either constantly or after actuating the ignition switch and/or a central locking device, whereby this voltage is higher than the reference voltage at point B. Alternatively terminal A' may be connected to the inverted input of the first comparator K1, in which case a resistor R9 must be inserted between the input K1 and the voltage reference point between R3 and R4. This alternate arrangement is shown dashed in FIG. 2. The mode of operation of this circuit is as follows:

In position 1 switch S1, the light L burns constantly. In the position 2 of switch S1, the output voltage of comparator K1 is the same as the supply voltage as described before. This output of K1 is decoupled from the noninverted input of the second comparator K2 by the diode D which is positioned in the reverse direction. When switch S2 is closed, that is, when the door of the vehicle is open, the treshold voltage of the diodes D1, D2 which are switched in series is applied to the inverted input of the second comparator K2 which is lower than the second reference voltage on its noninverted input, so that the output current of the second comparator K2 flows to the bse of transistor T1, turning T1 on and light L is activated.

When switch S2 is opened, that is, when the vehicle door is closed, the condenser C is charged through the high resistance dropping resistor R8 at time constant $t = R8 \cdot C$. The light L burns only as long as the voltage of the noninverted input of the second comparator K2 i.e. the voltage at point B is equal to or larger than the voltage caused by the rising condenser voltage, the reference voltage being applied on the noninverted input by means of the dropping resistor R6. The light L shuts off when the condenser C is charged at point A to the value of the supply voltage. This is higher than the value of the reference voltage at point B. Therefore, after a time $\Delta T$ determined by C and R8 the output of the second comparator K2 drops to the 0-voltage and no base current flows any longer to T1, the transistor T1 closed and interrupts the current flow through light L.

When the ignition is actuated and/or when the door is locked after the door has been closed, through said central locking system the battery voltage is applied on point A at Z and ZV respectively. The battery voltage at Z or ZV automatically overrides the delay action of the capacitor C and turns off comparator K2, and therefore transistor T1 and lamp L instantly.

When the ignition and central locking signal are routed through terminal A' instead of terminal A, as shown by the dashed lines in FIG. 2 the system works as follows:

After the door is closed and S2 opens C starts charging to the battery voltage just like before. If its voltage (plus the threshold voltages of D1 and D2) reaches the reference voltage at B' comparator K2 is turned off as described above. However if the ignition is started or the door is locked through the central locking system, the battery voltage is applied through terminal A' to the inverted input of comparator K1 turning off said comparator K1 instantaneously. The low output of comparator K1 pulls down the non-inverted input to K2 through diode D turning off comparator K2, transistor T1 and the light L.

After the K2 has been turned off, in this case, C is still being charged toward the battery voltage through R8. Therefore if, before the end of $\Delta T$, the ignition is turned off or the door is unlocked removing the battery voltage from terminal A', then the output of K1 goes high again reversing the abovedescribed sequence and turning on lamp L.

When the switch S1 is in the position 0, the output of the comparator K2 is at ground potential caused by the coupling of its noninverted input, to ground through comparator K1 so that no current flows to the base of the transistor T1, even if the switch S2 is closed, that is, when the vehicle door is opened. Only a small quiescent current flows through the circuit due to the low power drain of the integrated circuits of the two comparators, the small loss resistive losses of the high resistance voltage divider R3, R4 and during closed switch S2 by the very low current flow through the high resistor R8.

I claim:

1. A circuit for activating a motor vehicle device comprising:
   a first switch operatively connected to a motor vehicle device and having a first position in which the device is directly activated; a second position which disables the device; and a third position;
   a door switch for activating said device when a door of said motor vehicle is opened;
   a semiconductor switch adapted to activate said device when said first switch is in said third position and said door switch is closed; and
   means for deactivating said semiconductor switch when said first switch is in said second position.

2. The circuit of claim 1 wherein said semiconductor switch comprises a first transistor with its collector and emitter in series with said first switch when said first switch is in said third position, and said means comprises a second transistor with its collector and emitter in series with said door switch and base of said first transistor, and a comparator controlling the base of said second transistor, said comparator having a first input connected in series with said first switch in said third position and a second input connected to a reference voltage source.

3. The circuit of claim 1 wherein said semiconductor switch comprises a first transistor with its collector and emitter in series with said first switch when said first switch is in said third position, and said means comprises a first comparator having a first input connected in series with said first switch in said third position, a second input connected to a reference voltage source and an output, and a second comparator having a first input connected to the output of said first comparator, a second input connected in series with said door switch and an output connected in series with the base of said first transistor.

* * * * *